Feb. 18, 1969         G. BOGNER ET AL         3,428,926
       SUPERCONDUCTOR CABLE SURROUNDED BY
         A PLURALITY OF ALUMINUM WIRES
              Filed Feb. 16, 1967

United States Patent Office 3,428,926
Patented Feb. 18, 1969

3,428,926
SUPERCONDUCTOR CABLE SURROUNDED BY A PLURALITY OF ALUMINUM WIRES
Günther Bogner, Erlangen, and Richard Dötzer, Nuremberg, Germany, assignors to Siemens Aktiengesellschaft, a corporation of Germany
Filed Feb. 16, 1967, Ser. No. 616,675
Claims priority, application Germany, Feb. 18, 1966, S 102,047
U.S. Cl. 335—216         17 Claims
Int. Cl. H01f 7/22

ABSTRACT OF THE DISCLOSURE

A superconductor in the form of a cable composed of a plurality of wires of high-field superconductor material respectively covered with coatings of ultrapure aluminum and a plurality of additional wires also of ultrapure aluminum. The wires of the cable are enclosed within an insulating sheath of aluminum oxide. The ultrapure aluminum wires and the ultrapure aluminum coatings of the high-field superconductor wires are all welded to each other by being cold-pressed against each other.

---

Figure 1:
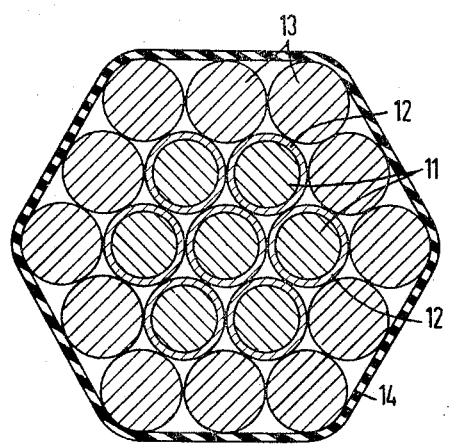

Our invention relates to superconductors.

In particular, our invention relates to a superconductor in the form of a cable which is adapted to be wound so as to form the coil of a superconductor magnet.

In the construction of superconductor magnet coils it is customary to use high-field superconductor wires or hard superconductor material which may consist, for example, of a superconducting intermetallic alloy of niobium-zirconium and niobium-titanium. These materials however, which are used for the coils of superconductor magnets, are electrically unstable because of magnetic flux-jumping. The result is localized transitions, of short duration, between the superconducting and normal conducting states. This instability leads, in particular with larger magnet coils, to an intense current degradation, which is to say, the superconductor coil windings undergo a transition into the normal conducting state at current densities which are substantially less than those encountered in short specimens of the same material in the same magnetic field. This current degradation results in an increased material requirement in order to achieve a given magnetic field.

It is possible to lower the degradation effect by coating the superconductor wires with a metal coating which is of good normal electrical conductivity and good thermal conductivity. Moreover, by providing between the several superconductor wires of the coil a parallel connection, by connecting the several superconductors to each other at their coatings of good thermal and normal electrical conductivity, it is possible to provide a superconductor in the form of a cable which has the load thereon relieved as a result of the conductors which are connected in parallel, in the event that any one individual conductor should become temporarily unstable. Thus, superconductor cables having this latter construction will remain superconducting for a flowing current even if there are instabilities in individual wires of the cable. Therefore, a magnet coil having this latter superconductor cable construction for its windings will undergo a transition into the normal conducting state only at relatively great current densities, as compared to the windings of a superconductor magnet coil composed only of individual wires which are not combined into a cable of the above type.

Superconductor cables of the above type which have their individual wires covered with a coating of copper are already known. Moreover, it is already known that the current-carrying capacity of such cables can be increased if additional copper wires are incorporated into the cable. (Review of Scientific Instruments 36 (1965), No. 6, pages 825–830.)

The use of copper leads to several disadvantages which are referred to below.

It is, accordingly, a primary object of our invention to provide substantial improvements in the construction of superconductors in the form of cables of the above type.

In accordance with our invention the superconductor takes the form of a cable composed of a plurality of wires of high-field superconductor material respectively provided with coatings which, at the operating temperature of the superconductor, are of good electrical normal conductivity and of good thermal conductivity, the cable further including additional wires which, at the operating temperature of the superconductor, are of good normal electrical conductivity and good thermal conductivity.

In accordance with our invention, the above wires which are of normal electrical conductivity at the operating temperature of the superconductor are composed of ultrapure aluminum having a purity of at least 99.99% by weight.

The use of ultrapure aluminum wires instead of copper wires in superconductor cables provides several advantages. Ultrapure aluminum has at low temperatures, particularly at the normal operating temperature of approximately 4.2° Kelvin for the superconductor, a greater electrical conducting capacity than copper of comparable purity and at least as good thermal conductivity as copper, while at the same time being much easier to manufacture than copper in its purest form. Moreover, the magnetic resistance changes of aluminum at low temperatures are substantially less than those of copper, so that when setting up a magnetic field of the same intensity for copper and aluminum, the electrical resistance of the aluminum will increase to a lesser extent than that of copper. Therefore, during transition of the superconductor wires of the cable into the normal conducting state as a result of a critical condition resulting from a rise in current in excess of the critical current, the current which flows through the superconductor wires can be taken over by aluminum wires of the cable much more easily, either in total or in part, than in the case of copper wires, without resulting in an increase in the temperature of the superconductor material above the critical temperature for the prevailing magnetic field. With a relatively small reduction in the current it is possible for the superconductor again to take over the entire current. As a result it becomes possible with a superconductor cable construction in accordance with our invention to prevent the breakdown of the magnetic field energy of a coil whose windings have the cable structure of our invention. The coil of our invention provides practically a combination of a superconducting and cryogenic magnetic coil.

Moreover, the superconductor cable of our invention is substantially lighter than a similarly constructed cable using copper wires, since aluminum has a substantially lower specific weight than copper. Therefore, by utilizing the superconductor cable of our invention it is possible to substantially reduce the weight of the superconducting magnetic coil. As a result of this reduction in weight there is a corresponding substantial reduction in the energy and cooling medium required for cooling. In order to cool equal volumes of copper and aluminum from the temperature of liquid nitrogen (approximately 78° K.) to the temperature of liquid helium (4.2° K.), aluminum uses only half the amount of helium required for copper.

The outstanding advantage of aluminum, as compared to copper, however, resides in its low recrystallization temperature which diminishes with increasing purity and which, depending upon the purity of the aluminum, is between −75° C. and +400° C. In the manufacture of a superconductor in the form of a cable, the individual wires which are superconducting and normal conducting are twisted about each other so as to achieve a good normal electrical contact as well as to provide a strong mechanical assembly of the individual wires. This twisting of the wires results in cold deformation thereof, and this cold deformation increases the residual electrical resistance of the normally conducting wires at low temperatures. Similar cold deformation is encountered in addition when the superconductor cable is wound into a superconducting coil. Because of the low recrystallization temperature of aluminum, the superconductor cable of our invention can have the defects therein resulting from cold deformation thereof cured out of the cable by annealing the cable after the cable is manufactured or after the cable is wound into a coil, and in this way the damaging action of the cold deformation on the electrical resistance of the aluminum can be eliminated. With a corresponding treatment of a superconductor cable composed of copper wires, however, it is essential to use, because of the high recrystallization temperature of copper, temperatures which are greater than 600° C. Annealing at these temperatures is, however, not possible, since such annealing will have a very undesirable influence on the superconducting properties of the superconducting wires of the cable which in particular is composed of a superconducting intermetallic alloy of niobium-zirconium or niobium-titanium. Furthermore, with aluminum of the highest purity a major part of the defects will be cured out of the aluminum even at room temperature, so that in some cases annealing will in general be unnecessary.

Materials suitable for the high-field superconductor material of the superconducting wires of superconductor cable of our invention are in particular intermetallic alloys of niobium-zirconium and niobium-titanium. For example, commercially available wires of these materials having copper coatings may be used.

In accordance with a further feature of our invention, the superconductor cable can be constructed in such a way that the coating on the superconducting wires, this coating being of an electrically normal conducting material, is also made of ultrapure aluminum. With such a construction, this coating of normal conducting metal has all of the advantages discussed above in connection with the use of aluminum instead of copper.

Also, according to a further feature of our invention, the several aluminum wires which engage each other, and in given cases the aluminum coatings of the superconducting wires, are metallically fused to each other by a cold press-welding process. By taking advantage of the softness of the ultrapure aluminum, it is possible in this way to achieve a particularly intimate contact between the individual wires of the cable. In order to join the wires so that they will become welded to each other it is possible, for example, to press the completed cable in a suitable manner. As a result the aluminum wires are deformed to a greater or lesser extent.

Inasmuch as the electrical conducting capacity and the thermal conducting capacity as well as the ductility of aluminum increases with decreasing content of impurities, it can be of advantage to use for the normally conducting wires and coatings of the superconductor cable of our invention even purer aluminum having a purity of at least 99.999% by weight.

The superconductor cable of our invention can also be provided with an electrically non-conductive sheath. This sheath can fully or partly surround the superconductor cable and may, for example, take the form of a tape which is wound around the cable at given spaced locations therealong. It is only of significance in this connection that by way of the insulation the different windings of a coil formed from the superconductor cable of our invention are prevented from coming into electrically-conducting contact with each other. Coils having windings composed of insulated cables can be excited with particular rapidity.

The insulating sheath is composed of an insulating material which is resistant to low tempeartures, such as, for example, a foil of polyethylene terephthalate, which is known under the trade name of Mylar.

It is of particular advantage, however, to provide for the superconductor cable of our invention a construction according to which the electrical insulation is made of aluminum oxide. Aluminum oxide has at room temperature a thermal conducting capacity which is about one hundred times greater than otherwise conventional organic insulating materials. Similar relationships are present at low temperatures. The superconductor cable having an aluminum oxide insulation can, therefore, be cooled in a manner far superior to a superconductor having an organic insulation material. Moreover, the heat which is present in given cases in the superconductor cable during whole or partial transition of the superconducting material into the normal conducting state can be conducted out of the superconductor cable in a superior manner. Furthermore, the high temperature stability of aluminum oxide provides advantages during the annealing of the superconductor cable in order to cure from the cable the cold deformation resulting during the cabling and winding processes. In spite of its extremely good thermal conducting properties, aluminum oxide is also an outstanding insulator. For example, at a temperature of 20° C. it is possible to achieve with eloxadized layers of aluminum dielectric strengths of 90 volts per $\mu$m. Therefore, insulating layers of aluminum oxide can be maintained relatively thin. Thicknesses of between a few $\mu$m. up to approximately 20 $\mu$m. are sufficient. This factor is of great advantage in achieving a highly compact assembly during winding of the magnet coil and for the purpose of providing a good carrying away of heat.

The insulating sheath of aluminum oxide can be mounted on the superconductor cable in different ways. For example, a tape of aluminum foil can be wound around the superconductor cable, and this tape can be anodically oxidized on one or both sides. Moreover, the superconductor cable can initially be provided with an aluminum coating which after it is situated on the superconductor cable is anodically oxidized. This coating can be manufactured either by being wound in the form of an aluminum tape around the superconductor cable or by galvanic deposition of aluminum on the superconductor cable. During the following anodic oxidation, the coating is only partly oxidized through its thickness so that an aluminum layer remains to cover the wires of the cable situated beneath the coating, the oxidation of the aluminum penetrating therethrough from the outer surface thereof but terminating short of the inner surface thereof.

Inasmuch as the insulating strength and the heat conducting capacity of aluminum oxide increases with increasing purity, it is of advantage to use also for the aluminum coating or sheath which is provided with the oxide layer aluminum of a purity of at least 99.99% by weight.

The galvanic deposition of ultrapure aluminum layers can advantageously take place by means of an aluminum organic electrolytic bath of a complex salt. In particular, baths of quaternary onium salt complex compounds of aluminum trialkylene dissolved in a suitable organic solvent such as, for example, xylene or toluene are suitable. Such quaternary onium salt complex compounds of aluminum are described in greater detail in the periodical "Chemie-Ingenieur-Technik," 1964, No. 6, pages 616–637 and in patent application Ser. No. 515,804.

An example of an aluminum deposition bath which provides good deposition results at temperatures between 80° and 120° C. is the electrolytic liquid

[(CH$_3$)$_3$(C$_6$H$_5$CH$_2$)N]Cl·2,2,Al(C$_2$H$_5$)$_3$·6 xylene containing a trimethylbenzyl ammonium chloride complex of aluminum thiethylene.

The anodic oxidation of the aluminum covering can advantageously be carried out with the aid of a known eloxidation process in an aqueous electrolytic bath. In this case, for example, the oxide layer is initially achieved electrochemically in an oxalic acid bath. Then a sealing process follows, and during the sealing the pores of the oxide layer are closed. In given cases the pores of the oxide layer can, in order to increase the dielectric strength, be filled before sealing with an organic or inorganic pigment or with an insulating lacquer. In the event that the superconductor cable is to be used for coils which will encounter only relatively small electric potentials, then, since the dielectric strength is not of primary importance, it can be of advantage to omit the sealing process. In this case the oxide layer will maintain its porous structure which is of advantage for a good cooling as a result of the particularly large surface area.

The individual wires of the superconductor cable of our invention can, in addition, in order to improve the electrical contact and thermal contact between the wires, be provided with a thin layer of a metal which has a good thermal conductivity and which has a great heat capacity and a low melting point. In addition, the spaces which are defined between the wires can be at least partially filled with such a metal. This construction can be provided by immersing the superconductor cable, before it is provided with the insulating layer or the aluminum coating, into a molten body of such a metal. Examples of such metals of low melting point are lead-bismuth alloys or indium-tin alloys. While these alloys are indeed superconducting at low temperatures, they undergo transition into the normal conducting state in a small magnetic field, so that during operation of the high-field superconductor in the form of the cable of our invention they are practically always in a normal electric conducting state. Indium has proved to be particularly suitable, indium having a melting point of 156° C. with indium of a purity of at least 99.999% by weight, the electrical residual resistance at low temperatures is particularly low. The thickness of the thin indium layer can advantageously be on the order of approximately $10^{-3}$ mm.

Figure 2:
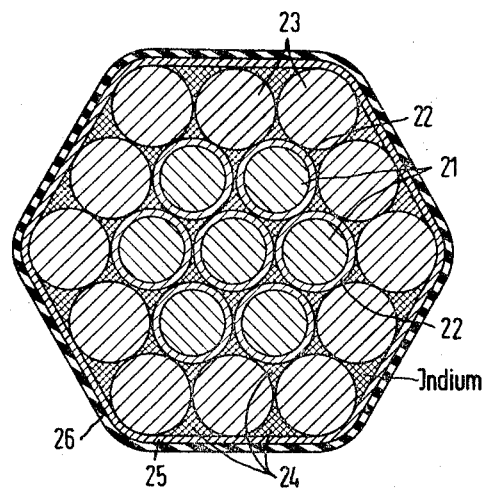

Our invention is illustrated by way of example in the accompanying drawings which form part of this application and in which:

FIG. 1 shows schematically in cross section and at a highly enlarged scale one possible embodiment of a superconductor cable according to our invention; and FIG. 2 schematically shows in cross section and also at a highly enlarged scale another embodiment of a superconductor cable of our invention.

The core of the superconductor cable which is illustrated in FIG. 1 is composed of the superconducting wires 11 made, for example, of niobium-zirconium and being provided with coatings 12, respectively, of a metal of good normal electrical conductivity and good thermal conductivity, this metal coating being, for example aluminum. The core of the cable is surrounded by the wires 13 which are of normal electrical conductivity and which are made of ultrapure aluminum. Thus, the cable is composed of the inner group of superconducting wires 11 which are respectively covered with the coatings 12 which are normally conducting and of good thermal conductivity at the operating temperature of the superconductor, and the inner group of coated wires 11 is surrounded by an outer group of wires 13 which extend longitudinally of and surround the inner group and which are made of the ultrapure aluminum which is normally conducting and of good thermal conductivity at the operating temperature of the superconductor. All of the wires of the cable are in good electrical normal-conducting contact and in good thermal contact with the neighboring wires, and as was pointed out above, all of these wires may be cold-pressure welded to each other so as to have an intimate contact with each other. The insulating sheath 14 is composed of a foil of polyethylene terephthalate.

In the embodiment of our invention which is shown in FIG. 2, the superconductor cable has a construction similar to that of FIG. 1. The core of the cable is composed of the superconducting wires 21 which are respectively covered with the coatings 22 of a metal of good normal electrical conductivity and good thermal conductivity, and this core is situated within and surrounded by the outer group of wires 23 which are made of ultrapure aluminum. The spaces 24 which are defined between these wires are filled with indium, although it is also possible simply to provide a thin coating of indium over the wires, as pointed out above. This cable includes an aluminum sheath 25 in which all of the wires and the indium are situated, and this aluminum sheath is oxidized in part so that the layer of aluminum oxide penetrates through the sheath from its outer surface toward but short of its inner surface, thus providing for the sheath an outer layer 26 of aluminum oxide insulation and an inner layer of aluminum which is directed toward the wires and the indium.

The form of the superconductor cable of our invention can be different from the particular form shown in the drawings. In particular, the number of wires which are included in the cable and their geometric arrangement can be varied.

We claim:

1. A superconductor in the form of a cable comprising a plurality of wires of high-field superconductor material covered with coatings of metal which, at the operating temperature of the superconductor, have good normal electrical conductivity and good thermal conductivity, and a plurity of additional wires of metal which, at the operating temperature of the superconductor, have normal electrical conductivity and good thermal conductivity, said additional wires being of ultrapure aluminum having a purity of at least 99.99% by weight.

2. A superconductor as recited in claim 1 and wherein the coatings which cover the superconductive wires and which are of normal electrical conductivity are also of ultrapure aluminum.

3. The combination of claim 2 and wherein said additional wires of aluminum and said aluminum coatings which cover said superconductive wires are all welded together.

4. The combination of claim 1 and wherein said additional wires of aluminum are welded to each other.

5. A superconductor as recited in claim 1 and wherein all of said wires are located at least in part within an electrically non-conductive sheath.

6. A superconductor as recited in claim 5 and wherein said sheath is of aluminum oxide.

7. A superconductor as recited in claim 6 and wherein said sheath is in the form of an anodically oxidized foil of aluminum which is wound around said wires.

8. A superconductor as recited in claim 6 and wherein said aluminum oxide sheath is in the form of an aluminum coating which is partially anodically oxidized.

9. A superconductor as recited in claim 6 and wherein said aluminum oxide sheath is anodically oxidized and has sealed pores filled with a material selected from the group consisting of organic pigment, inorganic pigment, and insulating lacquer.

10. A superconductor as recited in claim 6 and wherein said aluminum oxide sheath has a porous structure.

11. A superconductor as recited in claim 1 and wherein all of said wires are covered with at least a thin layer of a metal of good thermal conductivity, large heat capacity, and low melting point.

12. A superconductor as recited in claim 1 and wherein all of said wires define between themselves spaces which are at least partly filled with a metal of good heat conductivity which has also a great heat capacity and a low melting point.

13. A superconductor as recited in claim 1 and wherein said wires define spaces between themselves, a metal of good thermal conductivity and low melting point being situated in said spaces in contact with said wires, and said metal being indium.

14. A superconductor as recited in claim 13 and wherein said indium has a purity of at least 99.999% by weight.

15. A superconductor as recited in claim 1 and wherein said cable is wound into the form of a coil which is adapted to form part of a superconductor magnet.

16. A superconductor in the form of a cable comprising an inner group of wires of high-field superconductor material respectively covered with coatings which, at the operating temperature of the superconductor, are of good normal electrical conductivity and good thermal conductivity, and an outer group of wires extending longitudinally along and surrounding said inner group, said outer group of wires having, at the operating temperature of the superconductor, a good normal electrical conductivity and a good thermal conductivity, said outer group of wires and said coatings being of ultrapure aluminum having a purity of at least 99.99% by weight.

17. A superconductor as recited in claim 16 and wherein an insulating sheath surrounds and encloses all of said wires and is composed of aluminum, said sheath having an outer surface directed away from and an inner surface directed toward and located adjacent said outer group of wires, and said sheath being in the form of aluminum oxide in the region of said outer surface thereof and through a depth which terminates short of said inner surface thereof.

References Cited

UNITED STATES PATENTS

| 3,332,047 | 7/1967 | Borchert | 335—216 |
| 3,349,169 | 10/1967 | Donadieu | 174—126 XR |

GEORGE HARRIS, *Primary Examiner.*

U.S. Cl. X.R.

174—126, 110

UNITED STATES PATENT OFFICE
CERTIFICATE OF CORRECTION

Patent No. 3,428,926                                      February 18, 1969

Günther Bogner et al.

It is certified that error appears in the above identified patent and that said Letters Patent are hereby corrected as shown below:

In the heading to the printed specification, line 9, "S 102,047" should read -- S 102,094 --.

Signed and sealed this 14th day of April 1970.

(SEAL)
Attest:

Edward M. Fletcher, Jr.                            WILLIAM E. SCHUYLER, JR.
Attesting Officer                                               Commissioner of Patents